US012497265B2

(12) United States Patent
Fujiwara et al.

(10) Patent No.: US 12,497,265 B2
(45) Date of Patent: Dec. 16, 2025

(54) DEVICE AND METHOD FOR ESTIMATING ELEVATOR WAITING TIME

(71) Applicant: Hitachi, Ltd., Tokyo (JP)

(72) Inventors: Masayasu Fujiwara, Tokyo (JP); Wataru Toriumi, Tokyo (JP); Takahiro Hatori, Tokyo (JP); Taichi Saito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 388 days.

(21) Appl. No.: 18/030,787

(22) PCT Filed: Oct. 4, 2021

(86) PCT No.: PCT/JP2021/036630
§ 371 (c)(1),
(2) Date: Apr. 7, 2023

(87) PCT Pub. No.: WO2022/091705
PCT Pub. Date: May 5, 2022

(65) Prior Publication Data
US 2023/0373753 A1 Nov. 23, 2023

(30) Foreign Application Priority Data
Oct. 27, 2020 (JP) ................................ 2020-179380

(51) Int. Cl.
*B66B 3/00* (2006.01)
*B66B 5/00* (2006.01)

(52) U.S. Cl.
CPC ............ *B66B 3/002* (2013.01); *B66B 5/0012* (2013.01)

(58) Field of Classification Search
CPC ......... B66B 3/002; B66B 5/0012; B66B 3/00; Y02B 50/00
See application file for complete search history.

(56) References Cited

U.S. PATENT DOCUMENTS 5,304,752 A 4/1994 Hayashi
6,184,802 B1 * 2/2001 Lamb .................... G08G 1/123 340/988

(Continued)

FOREIGN PATENT DOCUMENTS

CN 106144804 B * 1/2019 .............. B66B 1/14
EP 3521230 A1 8/2019

(Continued)

OTHER PUBLICATIONS

Extended European Search Report received in corresponding European Application No. 21885824.9 dated Sep. 2, 2024.

(Continued)

*Primary Examiner* — Tung S Lau
(74) *Attorney, Agent, or Firm* — MATTINGLY & MALUR, PC

(57) ABSTRACT

A queueing start measurement unit which measures arrival of an elevator user at a preset location; a boarding measurement unit which measures boarding of the elevator user in an elevator car; a storage unit which stores an arrival time measured by the queueing start measurement unit and a boarding time measured by the boarding measurement unit; and a waiting time calculation unit which, on the basis of the arrival time and the boarding time stored in the storage unit, calculates a waiting time for which the elevator user is expected to wait before boarding the elevator car are provided. As a result, it is possible to calculate a waiting time at an elevator landing area with simple processing and a simple configuration.

5 Claims, 10 Drawing Sheets

(56) References Cited

U.S. PATENT DOCUMENTS

| | | | | |
|---|---|---|---|---|
| 2012/0020518 | A1 | 1/2012 | Taguchi et al. | |
| 2015/0021123 | A1 | 1/2015 | Lee et al. | |
| 2016/0102490 | A1* | 4/2016 | Kobler | G06Q 50/40 700/9 |
| 2016/0347577 | A1 | 12/2016 | Simcik et al. | |
| 2019/0303806 | A1* | 10/2019 | Namba | G06Q 50/40 |

FOREIGN PATENT DOCUMENTS

| | | | |
|---|---|---|---|
| GB | 2555343 | A | 4/2018 |
| JP | 2014015289 | A | 1/2014 |
| JP | 2018052681 | A | 4/2018 |
| JP | 2019023124 | A2 | 2/2019 |
| WO | 2010098024 | A | 9/2010 |

OTHER PUBLICATIONS

International Search Report of PCT/JP2021/036630 dated Dec. 7, 2021.

* cited by examiner

T11

| ID | Time | Event |
|---|---|---|
| 1011 | 8:12:10 | ARRIVAL |
| 1012 | 8:12:19 | ARRIVAL |
| 1013 | 8:12:25 | ARRIVAL |
| 1014 | 8:12:40 | ARRIVAL |
| 1015 | 8:12:45 | ARRIVAL |
| 1016 | 8:12:48 | ARRIVAL |
| 1017 | 8:12:50 | ARRIVAL |
| 1018 | 8:12:55 | ARRIVAL |
| 1019 | 8:12:57 | ARRIVAL |
| 1020 | 8:13:02 | ARRIVAL |
| 1021 | 8:13:10 | ARRIVAL |
| 1022 | 8:13:21 | ARRIVAL |
| 1023 | 8:13:25 | ARRIVAL |
| 1024 | 8:13:30 | ARRIVAL |
| 1025 | 8:13:34 | ARRIVAL |

T12

| ID | Time | Event |
|---|---|---|
| 1031 | 8:12:12 | BOARDING ELEVATOR CAR 1 |
| 1032 | 8:12:23 | BOARDING ELEVATOR CAR 2 |
| 1033 | 8:12:33 | OUT TO STAIRCASE |
| 1034 | 8:12:51 | BOARDING ELEVATOR CAR 4 |
| 1035 | 8:12:54 | OUT TO STAIRCASE |
| 1036 | 8:12:58 | BOARDING ELEVATOR CAR 4 |
| 1037 | 8:13:00 | BOARDING ELEVATOR CAR 4 |
| 1038 | 8:13:03 | BOARDING ELEVATOR CAR 4 |
| 1039 | 8:13:20 | BOARDING ELEVATOR CAR 3 |
| 1040 | 8:13:22 | BOARDING ELEVATOR CAR 3 |
| 1041 | 8:13:24 | BOARDING ELEVATOR CAR 3 |
| 1042 | 8:13:37 | BOARDING ELEVATOR CAR 6 |
| 1043 | 8:13:39 | BOARDING ELEVATOR CAR 6 |
| 1044 | 8:13:41 | BOARDING ELEVATOR CAR 6 |
| 1045 | 8:13:43 | BOARDING ELEVATOR CAR 6 |

T13

| ID1 | ID2 | Waiting Time |
|---|---|---|
| 1011 | 1031 | 2 |
| 1012 | 1032 | 4 |
| 1014 | 1034 | 8 |
| 1015 | 1036 | 11 |
| 1016 | 1037 | 13 |
| 1018 | 1038 | 8 |
| 1019 | 1039 | 23 |
| 1020 | 1010 | 20 |
| 1021 | 1041 | 14 |
| 1022 | 1042 | 16 |
| 1023 | 1043 | 14 |
| 1024 | 1044 | 11 |
| 1025 | 1045 | 9 |

FIG. 9

FIG. 10

T21

| ID | Time | Event |
|---|---|---|
| 2015 | 8:31:55 | MEASUREMENT LIMIT |
| 2016 | 8:32:10 | ARRIVAL |
| 2017 | 8:32:25 | ARRIVAL |
| 2018 | 8:32:41 | ARRIVAL |
| 2019 | 8:32:58 | ARRIVAL |
| 2020 | 8:33:53 | ARRIVAL |
| 2021 | 8:33:56 | ARRIVAL |

T22

| ID | Time | Event |
|---|---|---|
| 2035 | 8:32:50 | BOARDING ELEVATOR CAR 2 |
| 2036 | 8:32:56 | BOARDING ELEVATOR CAR 2 |
| 2037 | 8:33:12 | BOARDING ELEVATOR CAR 5 |
| 2038 | 8:33:16 | BOARDING ELEVATOR CAR 5 |
| 2039 | 8:33:20 | BOARDING ELEVATOR CAR 5 |
| 2040 | 8:34:07 | BOARDING ELEVATOR CAR 1 |
| 2041 | 8:34:10 | BOARDING ELEVATOR CAR 1 |

T23

| ID1 | ID2 | Waiting Time |
|---|---|---|
| 2015 | 2035 | >60 |
| 2016 | 2036 | 46 |
| 2017 | 2037 | 47 |
| 2018 | 2038 | 35 |
| 2019 | 2039 | 22 |
| 2020 | 2040 | 14 |
| 2021 | 2041 | 14 |

DEVICE AND METHOD FOR ESTIMATING ELEVATOR WAITING TIME

TECHNICAL FIELD

The present invention relates to a device and method for estimating an elevator waiting time.

BACKGROUND ART

Accurately grasping a waiting time for an elevator is very important in controlling the operation of the elevator and providing information to an elevator user. Patent Literature 1 discloses a technique of reading data of an elevator operation record and calculating a time for a passenger to wait for an elevator.

In addition, Patent Literature 2 discloses an elevator group management system that tracks each person who uses an elevator by analyzing images of a landing area of the elevator, a passage, and the like captured by a plurality of cameras to minimize a waiting time.

CITATION LIST

Patent Literature

Patent Literature 1: JP 2018-52681 A
Patent Literature 2: WO 2010/098024 A

SUMMARY OF INVENTION

Technical Problem

In the technique described in Patent Literature 1, a time from when a call button at an elevator landing area is pressed to when the elevator is dispatched and opened is approximated to a waiting time for the elevator. For this reason, the technique described in Patent Literature 1 has a problem that an accurate waiting time cannot be obtained when a crowded situation occurs to such an extent that the dispatched elevator cannot be boarded.

On the other hand, the technique described in Patent Literature 2 calculates the movement and behavior of each person in video captured by a camera by detecting and continuously tracking the movement and behavior by image analysis. For this reason, at the time of congestion, it is necessary to keep tracking a large number of persons moving across imaging ranges of a plurality of cameras for a long time. Therefore, the technique described in Patent Literature 2 has a problem that a complex algorithm or a large-scale system configuration is required in order to accurately calculate a waiting time.

Therefore, it has been desired to accurately estimate a waiting time for an elevator by a simple configuration or process that does not require a complex algorithm or a large-scale system configuration.

Solution to Problem

In order to solve the above problem, for example, the configuration described in the claims is adopted.

The present application includes a plurality of means for solving the above problem, and an example thereof includes, as a device for estimating an elevator waiting time, a queueing start measurement unit which measures arrival of an elevator user at a preset location; a boarding measurement unit which measures boarding of the elevator user in an elevator car; a storage unit which stores an arrival time measured by the queueing start measurement unit and a boarding time measured by the boarding measurement unit; and a waiting time calculation unit which, on the basis of the arrival time and the boarding time stored in the storage unit, calculates a waiting time for which the elevator user is expected to wait before boarding the elevator car.

Advantageous Effects of Invention

According to the present invention, it is possible to calculate a waiting time for an elevator with high accuracy with simple processing and configuration even at the time of congestion with many users.

Problems, configurations, and effects other than those described above will be clarified by the following description of embodiments.

BRIEF DESCRIPTION OF DRAWINGS

FIG. 9 is a diagram illustrating measured boarding time data and queueing start time data as a table in the device for estimating an elevator waiting time according to the present invention.

FIG. 10 is a diagram illustrating an example of a state in a case where the device for estimating an elevator waiting time according to the present invention cannot acquire a queueing start time due to a queue beyond the measurable range of the sensor installed by an elevator user.

DESCRIPTION OF EMBODIMENTS

Hereinafter, a device for estimating an elevator waiting time according to an embodiment (hereinafter referred to as "present example") of the present invention will be described with reference to the accompanying drawings.

Configuration of Device

Figure 1:
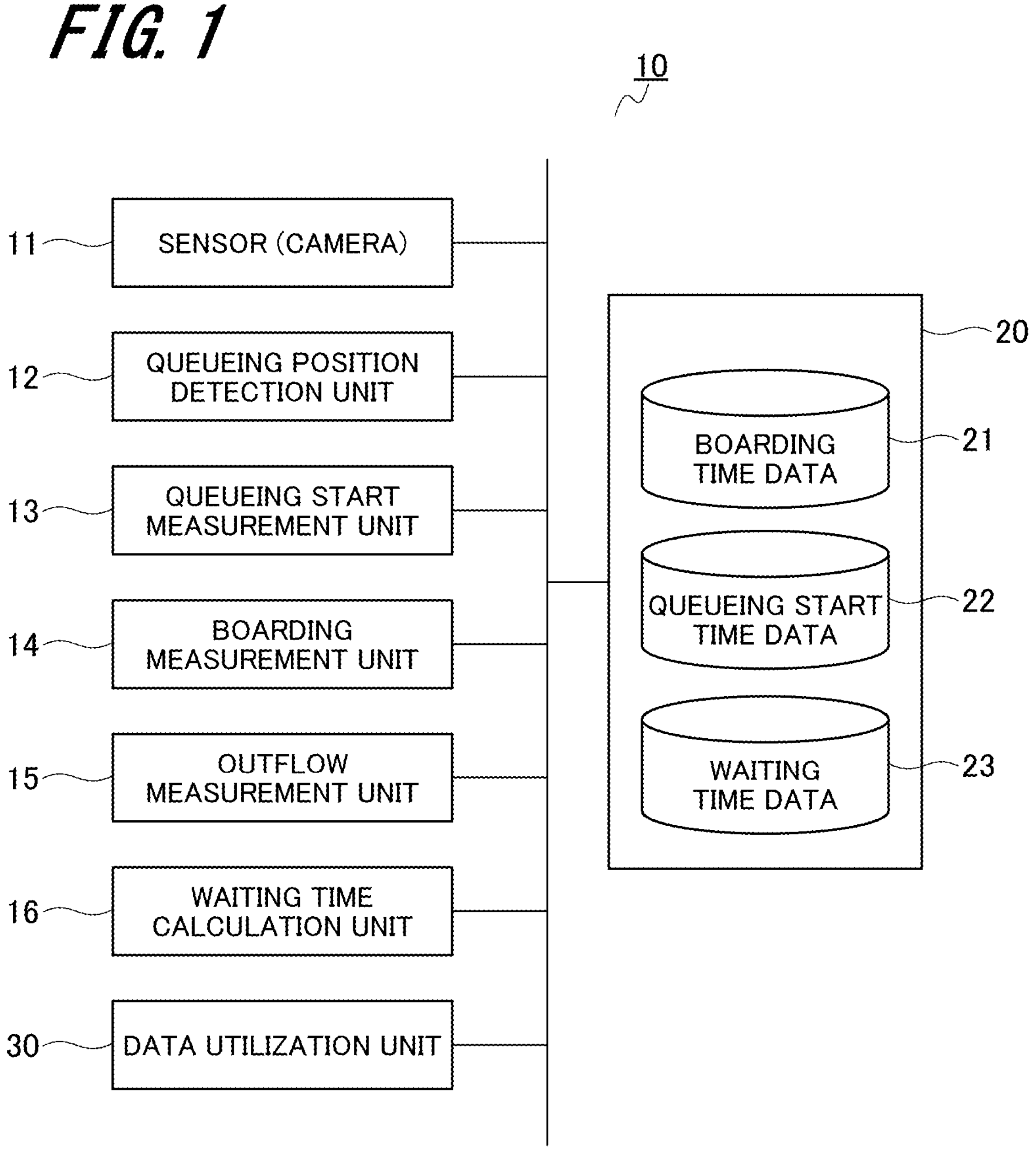
FIG. 1 is a configuration diagram illustrating an example of a device for estimating an elevator waiting time according to an embodiment of the present invention.

FIG. 1 illustrates a configuration of a device 10 for estimating an elevator waiting time of the present example.

The device 10 for estimating an elevator waiting time of the present example includes at least one sensor 11, a queueing position detection unit 12, a queueing start measurement unit 13, a boarding measurement unit 14, an outflow measurement unit 15, a waiting time calculation unit 16, and a storage unit 20.

The sensor 11, the queueing position detection unit 12, the queueing start measurement unit 13, the boarding measurement unit 14, the outflow measurement unit 15, the waiting time calculation unit 16, and the storage unit 20 are connected to each other directly or via a network. In addition, the device 10 for estimating an elevator waiting time of the present example includes a data utilization unit 30 that utilizes waiting time data calculated by the waiting time calculation unit 16.

The sensor 11 is a sensor that measures a predetermined position around a landing area of an elevator, and includes a camera, a laser sensor, or the like that captures an image of a measurement range, and detects a person in the measurement range. For example, when a camera is used as the sensor 11, an image captured by the camera is analyzed to detect the position of each person present in the imaging range (measurement range). That is, the sensor 11 measures a range in which an elevator user is present, such as an elevator hall and the vicinity thereof as described later.

When a user of the elevator queues within the range measured by the sensor 11 in order to board an elevator car, the queueing position detection unit 12 detects the queueing position from data measured by the sensor 11.

The queueing start measurement unit 13 measures a queueing start time when each user starts queueing at the queueing position detected by the queueing position detection unit 12. The queueing start time measured by the queueing start measurement unit 13 is accumulated in a queueing start time data accumulation unit 22 of the storage unit 20.

When a user within the range measured by the sensor 11 boards the elevator car, the boarding measurement unit 14 measures the boarding time of each user. The boarding time measured by the boarding measurement unit 14 is accumulated in a boarding time data accumulation unit 21 of the storage unit 20.

When the user within the range measured by the sensor 11 flows out of the measurement range without boarding the elevator car, the outflow measurement unit 15 measures the outflow time of the user.

The waiting time calculation unit 16 calculates a waiting time of each user based on the queueing start time accumulated in the queueing start time data accumulation unit 22 and the boarding time accumulated in the boarding time data accumulation unit 21. However, in a case where the waiting time calculation unit 16 calculates the waiting time, when a person who has flown out of the measurement range without boarding the elevator car and has been measured by the outflow measurement unit 15 is present, the waiting time calculation unit 16 excludes the person and calculates the waiting time. A specific example in which the waiting time calculation unit 16 calculates the waiting time will be described later. The waiting time calculated by the waiting time calculation unit 16 is accumulated in a waiting time data accumulation unit 23 of the storage unit 20.

The data utilization unit 30 utilizes data of the waiting time accumulated in the waiting time data accumulation unit 23. For example, a control device that controls the operation of the elevator includes the data utilization unit 30, sets the operation mode of the elevator car, sets the number of elevator cars to be operated, and the like according to the waiting time, and performs the operation control so that the waiting time becomes appropriate.

In addition, the data utilization unit 30 may be provided in a monitoring center that remotely manages the operation of the elevator or a monitoring room where a manager of a building waits, and a current value and a history of the waiting time may be displayed on a display device of the data utilization unit 30. As described above, when the waiting time is displayed for monitoring, the data utilization unit 30 can be configured as a dashboard system that visualizes the operation status of the elevator using a graph, a diagram, an animation, or the like, for example.

Furthermore, the data utilization unit 30 may be provided at the landing area of the elevator to display the current congestion situation to an elevator user on the display device of the data utilization unit 30 based on the data of the waiting time. As described above, in a case where the waiting time is displayed as a service to the user, the data utilization unit 30 can be configured as a digital signage system.

Hardware Configuration Example in Case Where Device is Computer

Figure 2:
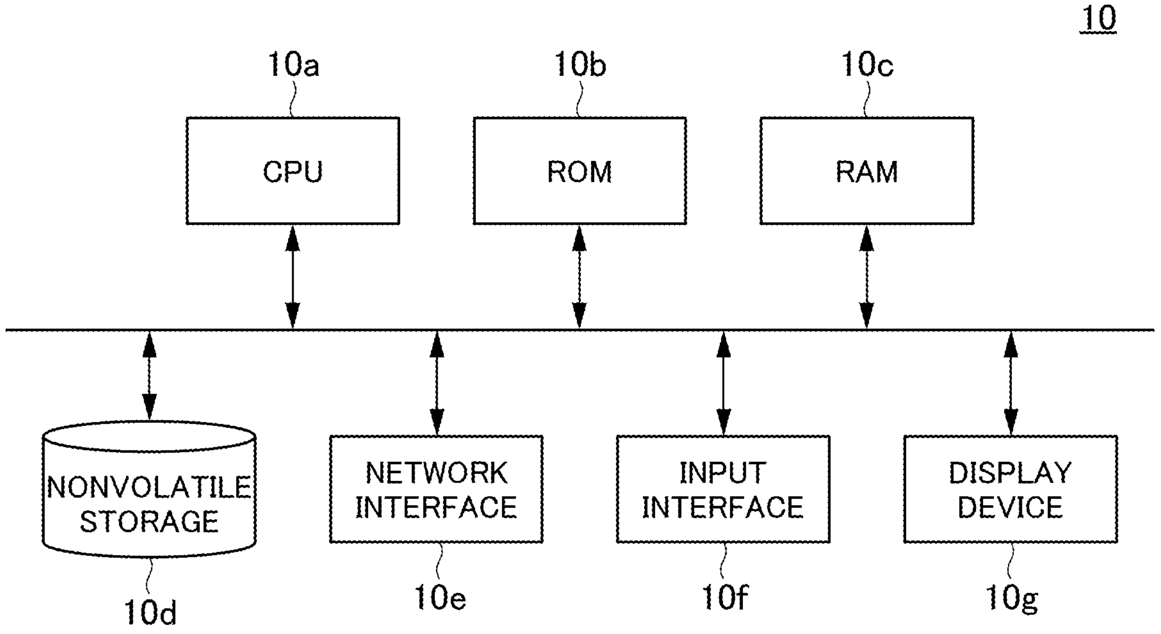
FIG. 2 is a block diagram illustrating a hardware configuration example in a case where the device for estimating an elevator waiting time according to the embodiment of the present invention is constituted by a computer device.

FIG. 2 illustrates a hardware configuration example in a case where the device 10 for estimating an elevator waiting time of the present example is constituted by a computer device.

The device (computer device) 10 for estimating an elevator waiting time illustrated in FIG. 2 includes a central processing unit (CPU) 10*a*, a read only memory (ROM) 10*b*, and a random access memory (RAM) 10*c* which are connected to a bus. Further, the device 10 for estimating an elevator waiting time includes a nonvolatile storage 10*d*, a network interface 10*e*, an input interface 10*f*, and a display device 10*g*.

The CPU 10*a* is an arithmetic processing unit that reads a program code of software for executing processing in the device 10 for estimating an elevator waiting time from the ROM 10*b* and executes the program code. In the ROM 10*b*, a program related to a waiting time calculation processing function executed by the device 10 for estimating an elevator waiting time is recorded.

A variable, a parameter, and the like generated during arithmetic processing are temporarily written to the RAM 10*c*.

The nonvolatile storage 10*d* is, for example, a large-capacity information storage unit such as a hard disk drive (HDD) or a solid state drive (SSD). The nonvolatile storage 10*d* stores, for example, data stored in the storage unit 20 illustrated in FIG. 1, that is, data of the boarding time data accumulation unit 21, the queueing start time data accumulation unit 22, and the waiting time data accumulation unit 23.

The network interface 10*e* performs processing of transmitting data such as the waiting time to the external data utilization unit 30 or the like.

Image data and the like acquired by the sensor 11 are input to the input interface 10*f*.

The display device 10$g$ displays data such as the waiting time.

Note that the device 10 for estimating an elevator waiting time is constituted by the computer device illustrated in FIG. 2 as an example, and may be constituted by another arithmetic processing device other than the computer device. For example, some or all of the functions performed by the device 10 for estimating an elevator waiting time may be implemented by hardware such as a field programmable gate array (FPGA) or an application specific integrated circuit (ASIC).

In addition, the measurement units 13, 14, and 15, the waiting time calculation unit 16, the storage unit 20, and the data utilization unit 30 may be constituted by different computer devices and connected to each other via a network.

Figure 3:
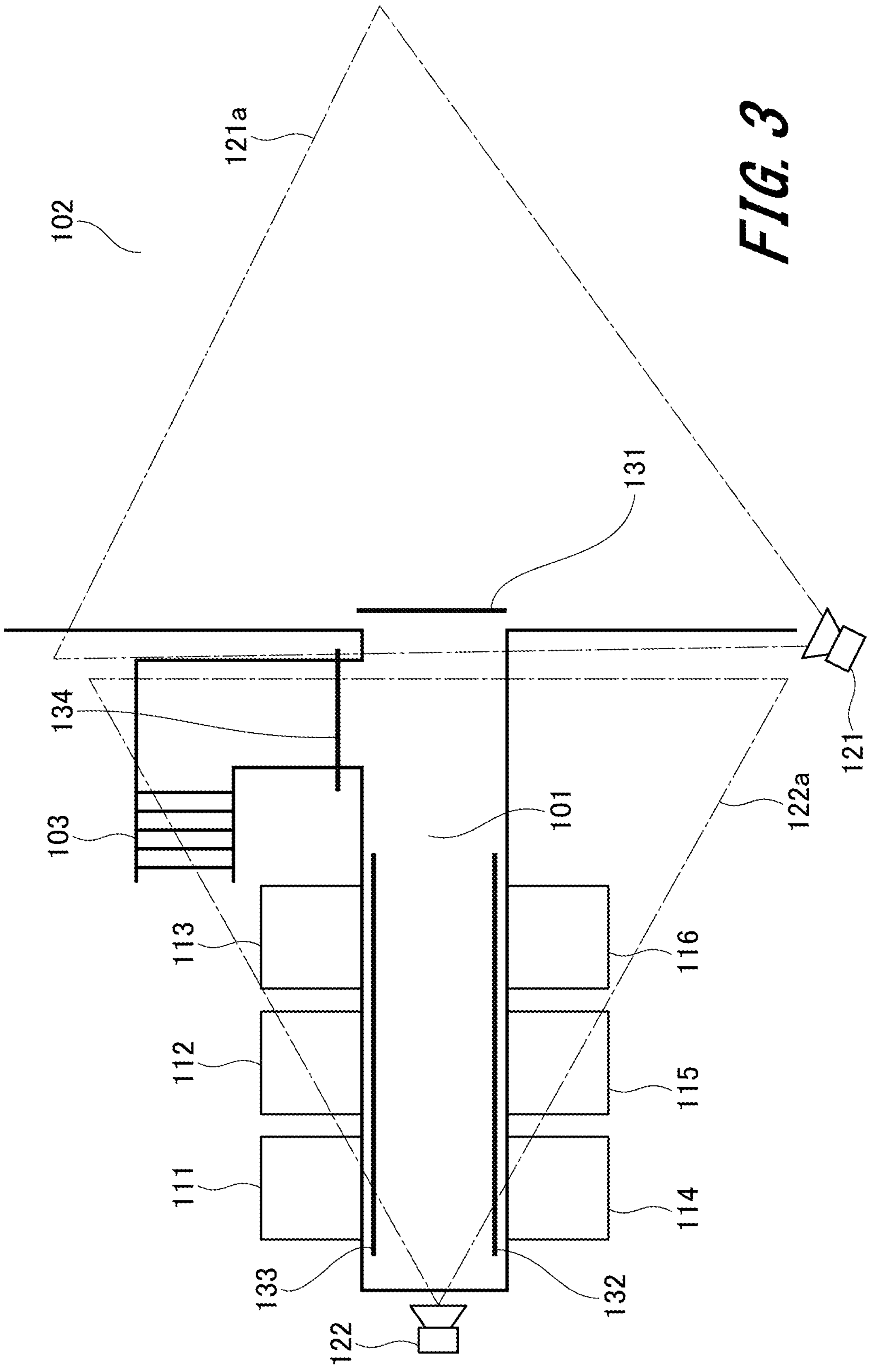
FIG. 3 is a diagram illustrating an example of a planar configuration of a lobby floor targeted by the device for estimating an elevator waiting time according to the embodiment of the present invention, a measurable range of a sensor, and a position for determining the start of queueing.

Layout of Target Building, and Installation Position and Measurement Position of Sensor FIG. 3 is a plan view illustrating a layout of a lobby floor where the device 10 for estimating an elevator waiting time of the present example estimates a waiting time.

FIG. 3 illustrates an example of a position that can be measured by the sensor 11 installed on the lobby floor and a position (queueing start position detection line) at which the sensor 11 determines boarding in an elevator car and the start of queueing for the elevator car. Note that, in the example of FIG. 3, a case where two cameras 121 and 122 are installed as the sensor 11 in an elevator lobby (elevator landing area 101) and a location (space 102 adjacent to the elevator landing area) adjacent to the lobby is illustrated.

Specifically, a measurement range 121$a$, which is a range captured by the camera 121, is the space 102 adjacent to the elevator landing area, and the space 102 is a hall at the building entrance or the like. A measurement range 122$a$ that is a range captured by the camera 122 is the elevator landing area 101.

An elevator user on the lobby floor passes through the space 102 adjacent to the elevator landing area, reaches the elevator landing area 101, and boards one of six elevator cars 111 to 116 at the elevator landing area 101. However, stairs 103 are connected to the elevator landing area 101, and a user who passes through the stairs 103 without using the elevator at the elevator landing area 101 is present.

A queueing start detection line 131 is set in the measurement range 121$a$ of the camera 121. Boarding detection lines 132 and 133 are set in the measurement range 122$a$ of the camera 122. An outflow detection line 134 for detecting a person flowing out to the stairs 103 is also set in the measurement range 122$a$ of the camera 122.

The camera 121 detects a person crossing the queueing start detection line 131, thereby detecting that the elevator user has started queueing. The camera 122 detects a person crossing the boarding detection lines 132 and 133, thereby detecting that the person has boarded one of the elevator cars 111 to 116.

In addition, the camera 122 detects a person crossing the outflow detection line 134, thereby detecting that the person who is at the landing area does not board an elevator and moves on the stairs 103. Note that the camera 122 may detect persons crossing the boarding detection lines 132 and 133 separately for each of the elevator cars 111 to 116.

In the layout as illustrated in FIG. 3, it is conceivable that not all people who have passed through the queueing start detection line 131 board the elevator and that some of the people use the stairs 103. As in this example, depending on the shape of the layout, it is also conceivable that the queueing start detection line 131 for detecting a queue for elevator users needs to be set at a position including a person other than the elevator users.

In such a case, it is necessary not to include a person who moves to another place such as using the stairs 103 in elevator users. Details of the process of distinguishing elevator users from persons who do not use the elevator will be described later.

Note that the position of the queueing start detection line 131 may be dynamically changed depending on the state of a queue. Details of an example of dynamically changing the queueing start detection line 131 will be described with reference to FIGS. 4 and 5.

<Example of State of Queue and Density of Persons Within Measurable Range>

Next, a flow of processing of estimating the waiting time of a user at the landing area by the device 10 for estimating an elevator waiting time of the present example will be described. Here, it is assumed that the waiting time is estimated in a case where the sensor 11 (cameras 121 and 122) is arranged in such a building layout as illustrated in FIG. 3.

In the present example, the device 10 for estimating an elevator waiting time detects the density of people in the measurable range from images captured by the cameras 121 and 122, and detects the tail end position of a queue of passengers from a change in the detected density and a density distribution.

Figure 4:
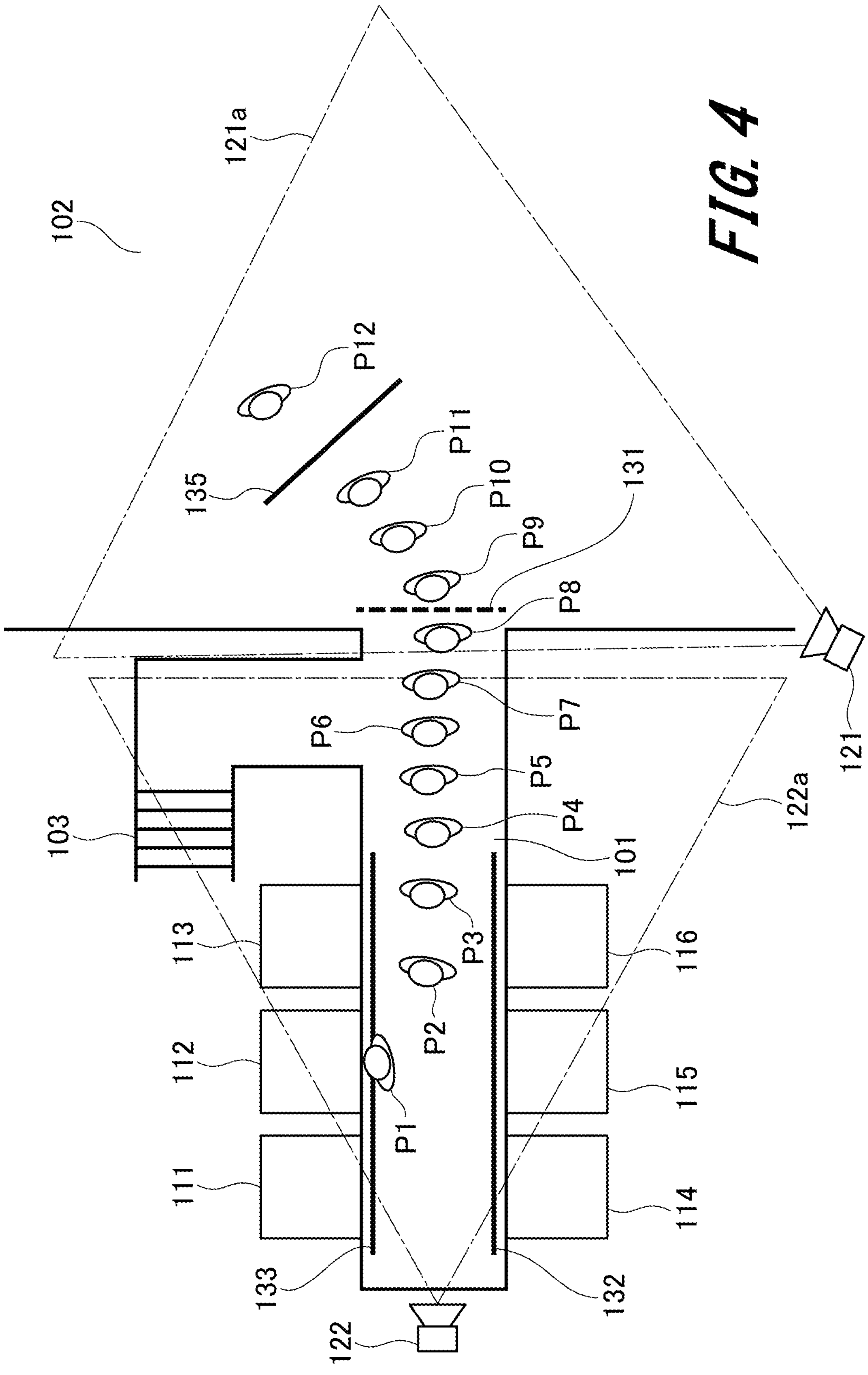
FIG. 4 is a diagram illustrating a state in which elevator users queue on the lobby floor illustrated in FIG. 3.

FIG. 4 illustrates an example of the state of a queue of elevator users in the elevator landing area 101 and the space 102 adjacent to the elevator landing area. In FIG. 4, P1, P2, P3, . . . represent elevator users.

The example illustrated in FIG. 4 illustrates a state in which the number of users has increased to such an extent that the elevator users have to queue in the landing area and board the elevator cars. That is, FIG. 4 illustrates a state in which 12 elevator users P1 to P12 queue in the elevator landing area 101 and the space 102 adjacent to the elevator landing area.

In the state illustrated in FIG. 4, since the queue is present beyond the queueing start detection line 131 illustrated in FIG. 3, not all the queueing start times of the queueing persons P1 to P12 cannot be detected only based on the queueing start detection line 131. Therefore, the tail end of the queue may be dynamically detected from the image captured by the camera 121, and the queueing start detection line may be set at a position further behind the tail end of the queue. For example, when a user at the tail end is the user P11, the position behind the user P11 may be used as the queueing start detection line.

Figure 5:
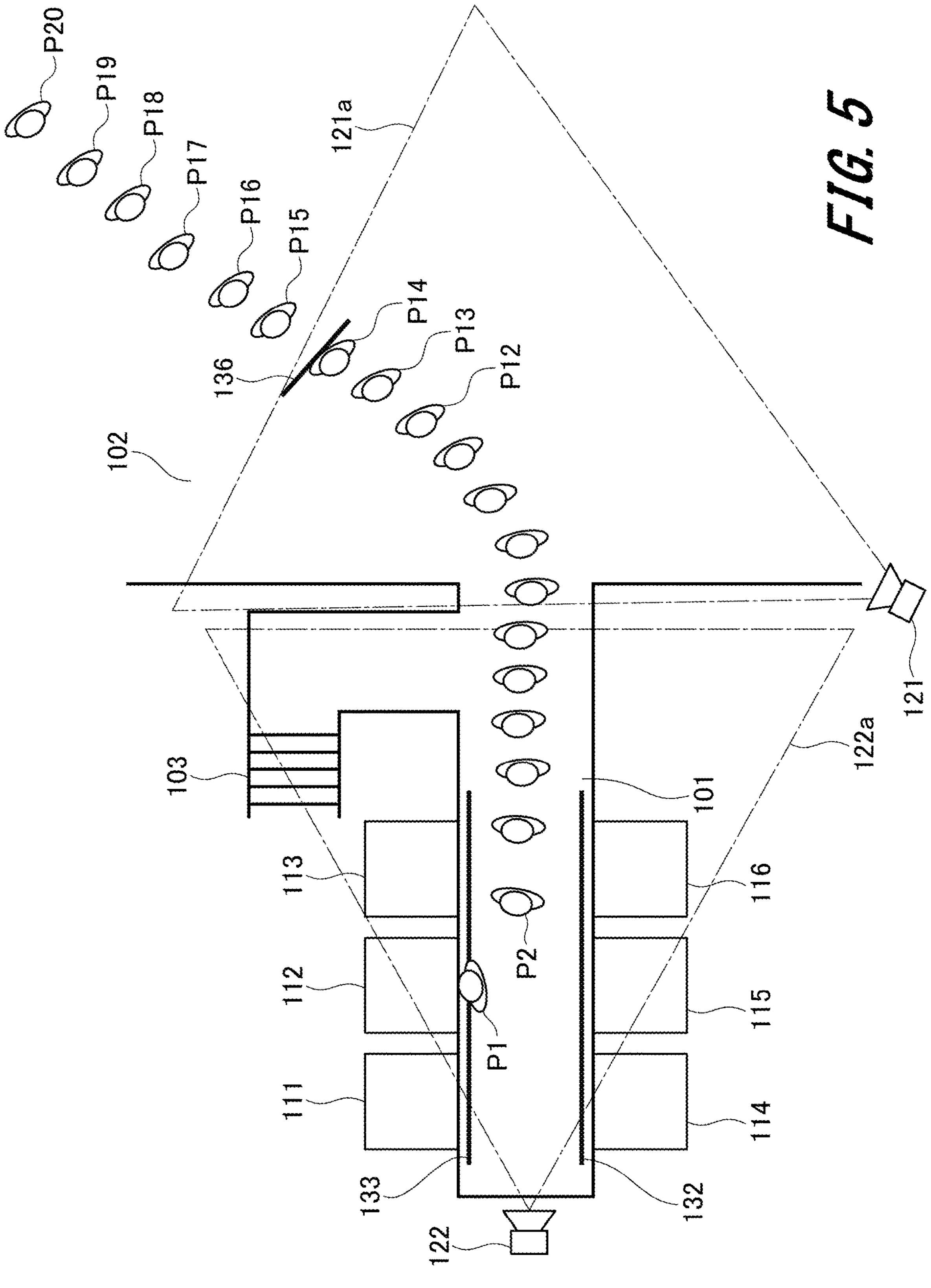
FIG. 5 is a diagram illustrating a state in which elevator users queue beyond the measurable range of the sensor on the lobby floor illustrated in FIG. 3.

FIG. 5 illustrates a state in which the number of users further increases from the state illustrated in FIG. 4, a place where elevator users queue is beyond the measurable range of the sensor 11 (cameras 121 and 122). In the state illustrated in FIG. 5, even if the queueing start detection line is provided within the measurable range of the sensor 11, not all the queueing start times of the queueing people cannot be detected.

In such a case, it is preferable to set a position detected based on a queueing start detection line 136 to the rearmost position of the measurable queueing so that the queueing start times of as many people as possible can be detected.

Note that the waiting time of an elevator user in the present example is defined as from the time when the queueing start time of the same user is detected to the time when the boarding of the same user in the elevator is detected.

That is, regarding the boarding in the elevator on the lobby floor illustrated in FIG. 3, it is assumed that the behavior tendency of persons who board the elevator cars 111 to 116 is to board the elevator cars in order from the first-come user, and the waiting time is calculated from the queueing start time and the boarding time.

Since users of the elevator usually board the elevator in the order of arrival at the landing area or in the order of queueing, if it is assumed that the users board the elevator in this queueing order, it can be said that the n-th user (n is an arbitrary integer) starts to queue at the n-th time and boards the elevator at the n-th time. That is, the waiting time can be calculated as a time from the n-th queueing start time to the n-th boarding time.

Considering the calculation of the waiting time for the layout of the lobby floor in the state illustrated in FIGS. 3 to 5, it can be seen that not only a person who boards the elevator but also a person who uses the stairs 103 cross the queueing start detection lines 131, 135, and 136 in FIGS. 3 to 5.

In this way, when it is not possible to set a queueing start line at a place through which only people who board the elevator pass, it is not possible to simply calculate the waiting time from the n-th queueing start time and the n-th boarding time. That is, it is necessary to exclude a person who uses the stairs 103 from persons who have passed through the queueing start detection line 131 and the like.

In order to handle such a case, as illustrated in FIG. 3, an outflow detection line 134 for detecting a person who flows out (moves to another place) without using the elevator, such as a person who uses the stairs 103, in addition to persons who board the elevator cars 111 to 116 is required.

Processing of Detecting Tail End Position of Queue

Next, an example of processing of detecting the tail end position of a queue in the queueing position detection unit 12 will be described.

Here, as an example of a method of detecting the tail end position of the queue, the density of persons in the measurable range 121*a* is detected by processing of analyzing an image captured by the camera 121, and the tail end position is detected from a change in the detected density and a density distribution.

Figure 6:
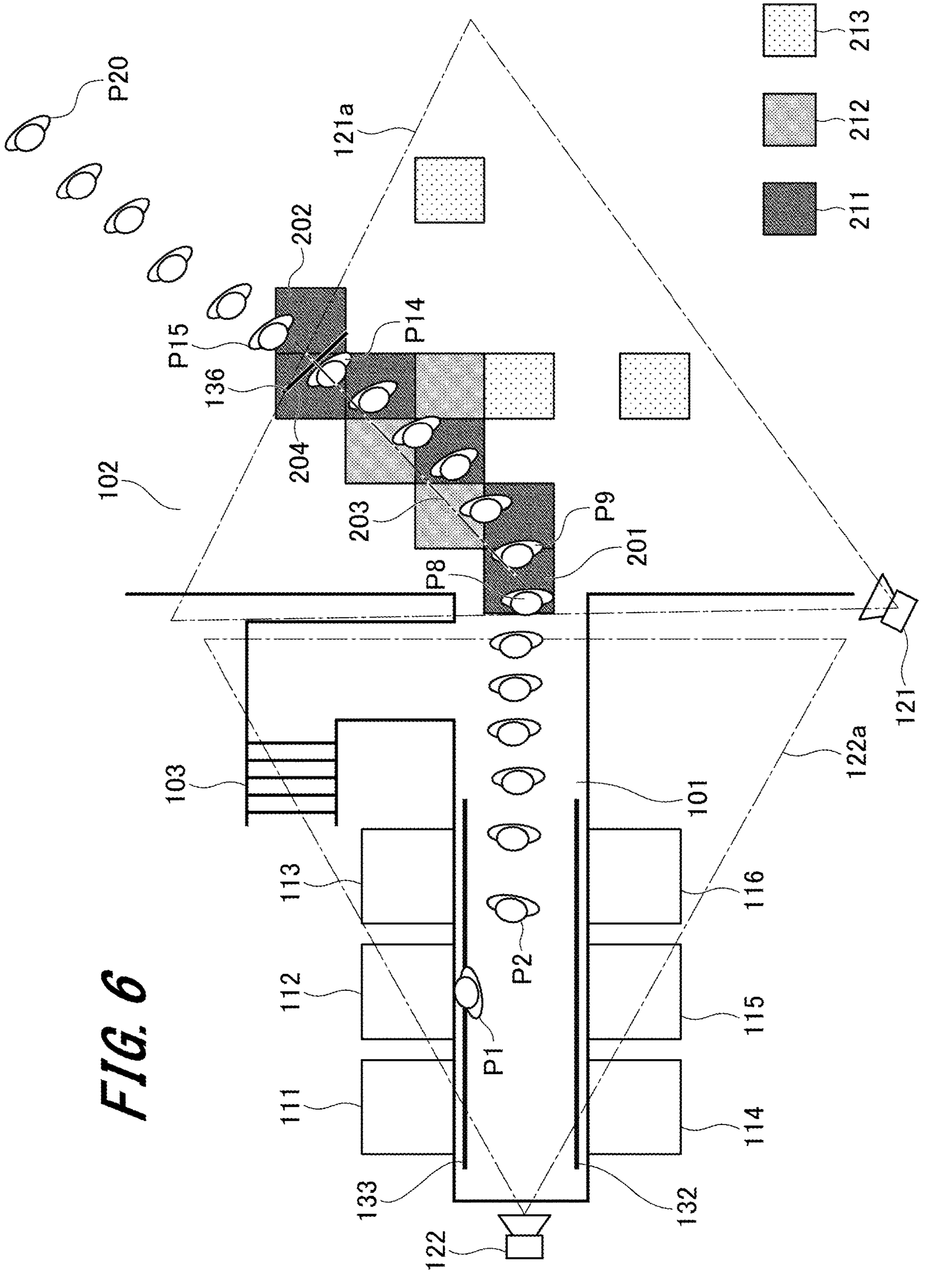
FIG. 6 is a diagram illustrating an example of a density calculated by the sensor to detect a tail end position of a queue for an elevator in the queueing state illustrated in FIG. 5.

FIG. 6 illustrates the density of persons in the measurement range 121*a* of the camera 121 in three stages of a high density range 211, a medium density range 212, and a low density range 213 in a situation where users P1 to P20 are queueing in the state illustrated in FIG. 5. However, the low density range 213 indicates only a part of the measurement range 121*a*.

In this case, the density is calculated based on the number of people staying in a certain space. That is, only a space (the high density range 211 in FIG. 6) where the density exceeds a predetermined threshold is connected from a preset queueing reference position 201, and a position 202 farthest away from the queueing reference position 201 is detected as the tail end position of the queue.

Then, a line segment 203 connecting the detected queue tail end position 202 and the queueing reference position 201 is drawn, and a line segment 204 perpendicular to the line segment 203 at a position close to the queue tail end position 202 separated from the queueing reference position 201 by a predetermined distance is set as the queueing start detection line 136.

However, in a case where the position of the perpendicular line segment 204 (queueing start detection line 136) is out of the measurement range of the sensor 11 (camera 121), the line segment 204 may be adjusted so as to be within the measurement range of the sensor 11. In this case, the camera 121 detects a person moving across the set queueing start detection line 136, and the queueing start measurement unit 13 records, in the queueing start time data accumulation unit 22, that the detection by the camera 121 is the detection at the measurement limit.

When the space indicating the high density 211 in FIG. 6 and exceeding the predetermined threshold cannot be detected, the queueing start detection line 136 set in advance is used. In addition, the detection of the tail end position of the queue is not limited to the method described herein, and other methods or algorithms may be applied.

Processing of Calculating Waiting Time

Figure 7:
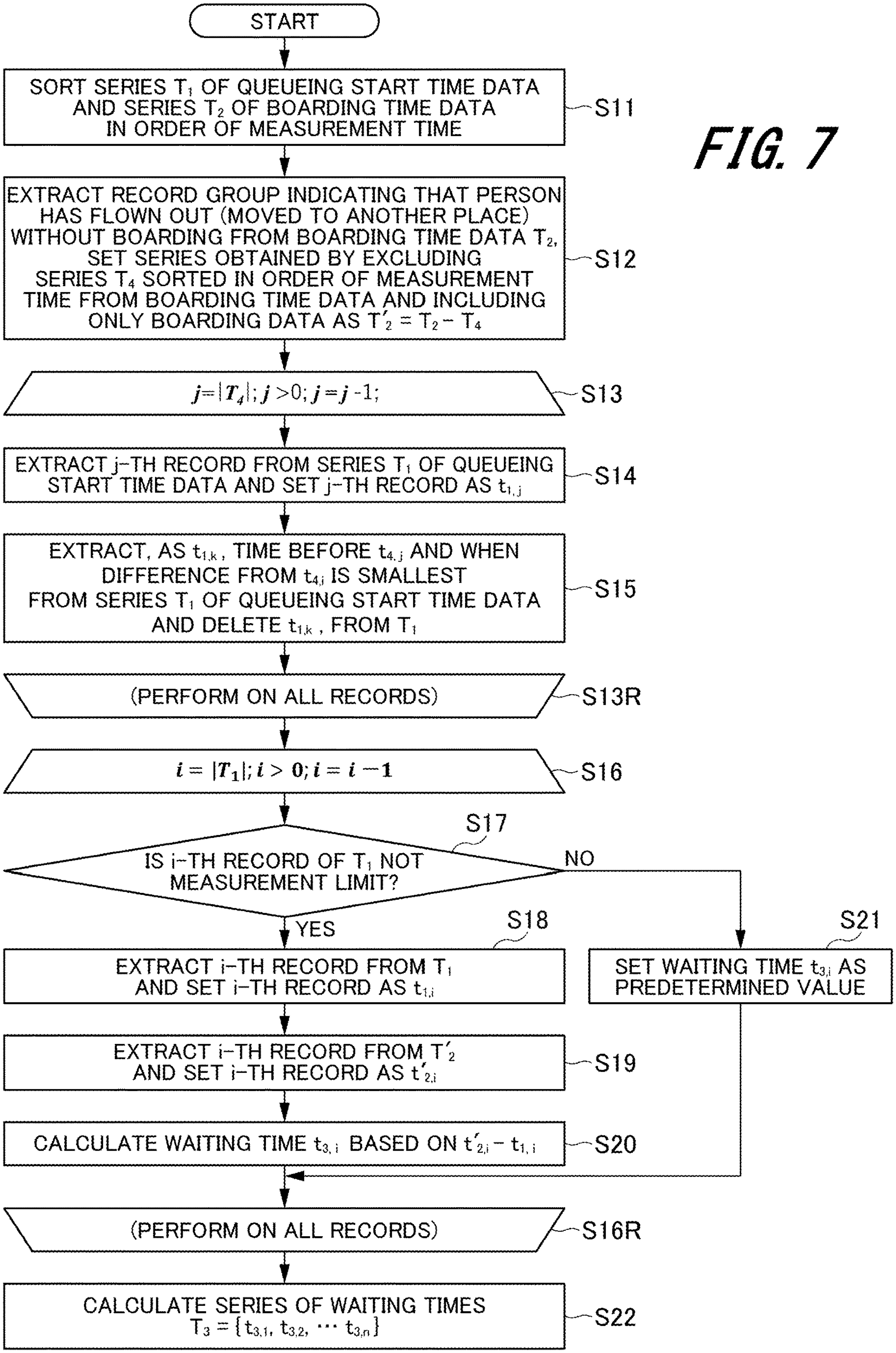
FIG. 7 is a flowchart illustrating an example of a process of calculating waiting time data from measured boarding time data and queueing start time data in the device for estimating an elevator waiting time according to the embodiment of the present invention.

FIG. 7 is a flowchart illustrating a flow of processing of calculating a waiting time in the waiting time calculation unit 16.

First, the waiting time calculation unit 16 sorts a series $T_1$ of queueing start time data and a series $T_2$ of boarding time data in order of measurement time (step S11). Then, the processing proceeds to processing of excluding a record group of measurement data indicating that a person has flown out (moved to another place such as the stairs) without boarding the elevator.

That is, the waiting time calculation unit 16 extracts, from the boarding time data $T_2$, a record group indicating that a person has flown out (moved to the stairs or the like) without boarding, and sets the extracted record group as a series $T_4$ sorted in order of measurement time. Then, the waiting time calculation unit 16 sets a series obtained by excluding the series $T_4$ from the boarding time data and including only the boarding data as $T_2'=T_2-T_4$ (step S12).

Next, the waiting time calculation unit 16 executes repetitive processing from step S14 to step S15 for the number of elements of $|T_4|$ in descending order of j (step S13). That is, the waiting time calculation unit 16 extracts the j-th record from the series $T_1$ of the queueing start time data as the repetitive processing and sets the j-th record as data $t_{(1, j)}$ (step S14).

Furthermore, the waiting time calculation unit 16 extracts data $t_{(1, k)}$ at a time before data $t_{(4, k)}$ and at a time when a difference from the data $t_{(4, k)}$ is the smallest from the series $T_1$ of the queueing start time data, and deletes the data $t_{(1, k)}$ from the series $T_1$ of the queueing start time data (step S15). Here, the reason why the waiting time calculation unit 16 deletes the data $t_{(1, k)}$ at the time when the difference from the data $t_{(4, k)}$ is the smallest from the series $T_1$ of the queueing start time data is to prevent the data $t_{(1, k)}$ at the time when the difference from the data $t_{(4, k)}$ is the smallest from being redundantly extracted as the same record from the queueing start time data $T_1$.

After the processing of step S15 is ended and the processing is performed on all records (step S13R), the waiting time calculation unit 16 performs repetitive processing of steps S17 to S20 for the number of elements of $|T_1|$ in descending order of i (step S16).

In the repetitive processing of step S16, the waiting time calculation unit 16 first determines whether the i-th record of the series $T_1$ is the measurement limit (step S17).

When it is determined in step S17 that the i-th record is not the measurement limit (YES in step S17), the waiting time calculation unit 16 extracts the i-th record from the queueing start time data $T_1$ and sets the i-th record as data $t_{(1, i)}$ (step S18). Then, the waiting time calculation unit 16 extracts the i-th record from the series $T_2'$ and sets the i-th record as data $t_{(2, i)}'$ (step S19).

Thereafter, the waiting time calculation unit 16 calculates the waiting time $t_{(3, i)}$ by calculating $[t_{(2, i)}'-t_{(1, i)}]$ (step S20).

In addition, in a case where it is determined in step S17 that the waiting time is the measurement limit (NO in step S17), the waiting time calculation unit 16 cannot accurately measure the waiting time, and thus sets a predetermined value set in advance as the waiting time $t_{(3, i)}$ (step S21).

Then, after the processing of step S20 or S21 is ended, in a case where a waiting time is not set for all the records, the waiting time calculation unit 16 returns to the processing from step S17 for another record, and when the processing for all the records is ended, the repetitive processing of step S16 is ended (step S16R).

After ending the repetitive processing of step S16, the waiting time calculation unit 16 outputs a series $T_3=\{t_{3, 1}, t_{3, 2}, \ldots, t_{3, n}\}$ of the calculated waiting times, and ends the processing (step S22).

In this manner, the waiting time calculation unit 16 can output the series of waiting times.

Specific Example of Waiting Time Data

Figure 8:
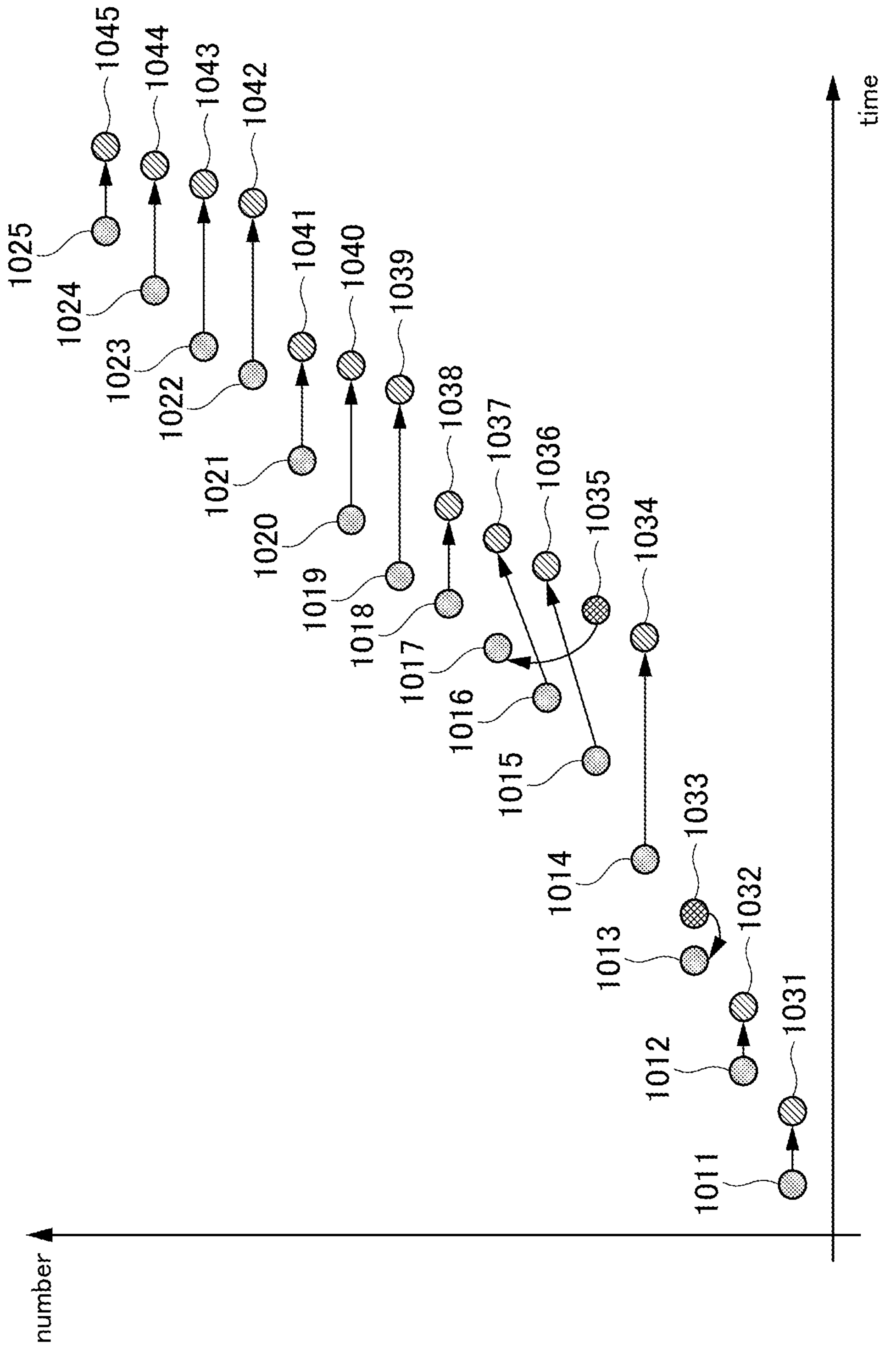
FIG. 8 is a diagram illustrating a relationship between measured boarding time data and queueing start time data plotted on a graph and an estimated waiting time in the device for estimating an elevator waiting time according to the embodiment of the present invention.

FIG. 8 is a graph illustrating a state in which arrival of elevator users at the landing area and boarding of elevator cars are sequentially detected one by one by the device 10 for estimating an elevator waiting time of the present example.

In FIG. 8, the horizontal axis represents time, and the vertical axis represents the cumulative number of people.

For example, as illustrated in FIG. 8, the first user arrives at a certain timing as indicated by 1011, and boards an elevator car as indicated by 1031 after a relatively short waiting time elapses from the arrival.

Thereafter, the second user arrives as indicated by 1012 and boards an elevator car as indicated by 1032. The arrivals 1011 and 1012 are measured by the queueing start measurement unit 13 when the users pass through the queueing start detection line 131. The boarding 1031 and 1032 is measured by the boarding measurement unit 14 when the users pass through the boarding detection line 132 or 133. The times from the arrivals 1011 and 1012 of the users to the boarding 1031 and 1032 are users' waiting times.

In the example of FIG. 8, the third user arrives at the landing area as indicated by 1013 after the boarding 1032 of the second user, but it is assumed that the third user flows out from the landing area to the stairs without boarding an elevator car as indicated by 1033. The outflow 1033 to the stairs is measured by the outflow measurement unit 15 when the user passes through the outflow detection line 134.

When the outflow 1033 to the stairs occurs, the outflow measurement unit 15 determines that the user with the minimum waiting time among users in the landing area at that time has flown out.

That is, in a case where a user uses the stairs, unlike the case of using the elevator, there is a low possibility that the user queues at the landing area. Therefore, it can be assumed that a waiting time from passing through the queueing start detection line 131 to passing through the outflow detection line 134 hardly occurs. For this reason, it is considered that the person having the shortest time different from the boarding start time before the boarding start time has flown out. In the case of the outflow 1033 illustrated in FIG. 8, it can be determined that the person who has arrived as indicated by 1013 immediately before the outflow has flown out.

Note that, in a case where the movement distance from the queueing start detection line 131 to the outflow detection line 134 is long, or the like, in consideration of the minimum movement time, the time may be assumed to be before the minimum movement time from the time of passage through the outflow detection line 134 and slightly different from the time of the passage through the outflow detection line 134. Here, in order to simplify the description, the minimum movement time is not considered.

Further, the arrival 1014 of the fourth user, the arrival 1015 of the fifth user, the arrival 1016 of the sixth user, and the 1017 arrival of the seventh user follow, but here, the fourth and subsequent users are not yet in a state of boarding until the arrival 1017 of the seventh user. In this state, it is assumed that after the arrival 1017 of the seventh user, boarding 1034 of the fifth user, and outflow 1035 to the stairs occur almost simultaneously.

In such a case, the outflow measurement unit 15 determines that the user who has flown out to the stairs as indicated by 1035 is the seventh user who has arrived as indicated by 1017 at the latest timing among the users waiting in the landing area on the basis of the above-described conditions.

Therefore, the boarding measurement unit 14 determines that boarding 1036 and 1037 after the outflow 1035 are boarding of the fifth and sixth users, respectively. Accordingly, the waiting time calculation unit 16 calculates a waiting time from the arrival 1015 to the boarding 1036 and a waiting time from the arrival 1016 to the boarding 1037.

In this manner, the waiting time calculation unit 16 of the present example appropriately calculates a waiting time for the elevator even when a person who has flown out to the stairs or the like is present.

In the example of FIG. 8, regarding arrivals 1018, 1019, . . . of the eighth and subsequent users, there is no outflow to the stairs, and every time boarding 1039, 1040, . . . occurs, the waiting time calculation unit 16 calculates the waiting time of each user.

FIG. 9 illustrates data examples of an arrival time table T11, a boarding time table T12, and a waiting time table T13 in a situation where elevator users illustrated in FIG. 8 have a waiting time.

The arrival time table T11 is data accumulated in the queueing start time data accumulation unit 22 illustrated in FIG. 1, and the boarding time table T12 is data accumulated in the boarding time data accumulation unit 21 illustrated in FIG. 1. The waiting time table T13 is data accumulated in the waiting time data accumulation unit 23 illustrated in FIG. 1.

In FIG. 9, these three tables T11, T12, and T13 are illustrated as individual tables, but may be collectively stored as one table.

The arrival time table T11 stores, as queueing start time data, for arrivals 1011 to 1025 illustrated in FIG. 8, the ID of each piece of data, the arrival times, and data of "arrival" indicating an event.

The boarding time table T12 stores, as boarding time data, for boarding 1031 to 1045 illustrated in FIG. 8, the ID of each data piece, the boarding times, and data indicating which elevator car a user boards, such as "boarding the elevator car 1" indicating an event. Data stored in this boarding time table T12 also includes data of the outflow 1033 and 1035.

The data of the outflow 1033 and 1035 also stores the ID of each data piece, the outflow times, and data of "out to stairs" indicating an event. Note that the boarding time table T12 stores boarded elevator cars as an example, and the data of the elevator cars may not be stored.

The waiting time table T13 stores data of the waiting time of each user calculated by the waiting time calculation unit 16. The data of the waiting time stores IDs (ID1 and ID2) of the arrival time data and the boarding time data, and the data of the waiting time (second) which is a difference between both times. The data of the waiting times stored in the waiting time table T13 corresponds to the series 13 of the waiting times calculated in step S22 of the flowchart of FIG. 7.

FIG. 10 illustrates an example of an arrival time table T21, a boarding time table T22, and a waiting time table T23 based on data different from the example of FIG. 9.

The example of FIG. 10 illustrates an example of a state in which the queueing start time cannot be acquired because the queueing has been performed beyond the measurable range of the sensor installed by the elevator user. That is, in the arrival time table T21, in data of an ID 2015 illustrated in the uppermost column, an event is a "measurement limit". This measurement limit means an event in a case where the queueing start detection line 136 is set in the vicinity of the end of the measurement range 121*a* and the queueing position detection unit 12 cannot detect the tail end of the queueing position as illustrated in FIG. 6, for example.

At this time, a difference between the time in the arrival time table T21 and the time in the boarding time table T22 is a waiting time, but in the waiting time table T23, data of ">60" to which an inequality sign ">" indicating that it is equal to or more than the difference time as the waiting time is added is stored.

In the example of FIG. 10, the difference between the arrival time indicated by the ID 2015 in the arrival time table T21 and the boarding time indicated by an ID 2035 in the boarding time table T22 is 55 seconds. However, since a waiting time equal to or longer than 55 seconds occurs, data ">60" is obtained by adding a slight time (5 seconds in this case) to the difference time.

The data utilization unit 30 utilizes the current and past waiting times calculated by the waiting time calculation unit 16 in this manner.

For example, when the data utilization unit 30 is installed in the elevator control device, the elevator control device executes group management so as to minimize a waiting time for the elevator at the landing area on the basis of the data of the waiting time.

In addition, in a case where the data utilization unit 30 is installed in an operation management department (such as a management room of the building) for the elevator, it is possible to cause a display device installed in the operation management department to display an operation index or an operation status of the elevator, such as a current value or a transition of a waiting time.

Furthermore, in a case where the data utilization unit 30 is included in a display device as a digital signage system that guides the elevator operation status to building users, the display device can display the current waiting time and congestion status.

As described above, according to the device 10 for estimating an elevator waiting time of the present example, it is possible to appropriately calculate the waiting time by independently measuring the elevator boarding time and queueing start time of each user on the lobby floor or the like of the elevator that moves from the entrance of the building to each floor.

Specifically, by calculating the waiting time on the assumption that users of the elevator board the elevator in order from a person who arrives earlier, it is possible to appropriately calculate the accurate waiting time with simple processing and configuration without tracking a movement line of each user. That is, assuming that each user boards the elevator in the order of queueing, a value obtained by subtracting the n-th (n is an arbitrary integer) arrival time measured by the queueing start measurement unit 13 from the n-th boarding time measured by the boarding measurement unit 14 matches the waiting time of the user who arrives at the queueing position and queues n-th. Therefore, according to the processing of the present example, it is possible to calculate the correct waiting time by simple processing of only detecting that each person has started queuing and detecting that each person has boarded the elevator without tracking a movement line of each person.

In addition, even in a case where there is a person who flows out to the stairs or the like from the elevator landing area, the waiting time can be accurately calculated by setting the outflow line from the landing area and calculating the waiting time while excluding the person who has flown out from the outflow line.

Modifications

Note that the present invention is not limited to the above-described embodiments, and includes various modifications. For example, the above-described embodiments have been described in detail in order to describe the present invention in an easily understandable manner, and are not necessarily limited to those having all the described configurations.

For example, the installation position of the sensor (cameras 121 and 122) in FIG. 3 and the like, the queueing start detection line 131, and the boarding detection lines 132 and 133 are merely examples, and are not limited to the illustrated examples. The queueing start detection line 131 may be dynamically changed according to the queueing situation as in the queueing start detection lines 135 and 136 illustrated in FIGS. 4 and 5.

Furthermore, in the block diagrams of FIGS. 1 and 2, only control lines and information lines considered to be necessary for description are illustrated, and not all control lines and information lines on a product are necessarily illustrated. In practice, it may be considered that almost all the configurations are connected to each other. Furthermore, in the flowchart illustrated in FIG. 7, a plurality of processes may be simultaneously executed or the processing order may be changed within a range not affecting the processing result.

REFERENCE SIGNS LIST

10 device for estimating an elevator waiting time
10*a* central processing unit (CPU)
10*b* ROM
10*c* RAM
10*d* nonvolatile storage
10*e* network interface
10*f* input interface
10*g* display device

11 sensor (camera)
12 queueing position detection unit
13 queueing start measurement unit
14 boarding measurement unit
15 outflow measurement unit
16 waiting time calculation unit
20 storage unit
21 boarding time data accumulation unit
22 queueing start time data accumulation unit
23 waiting time data accumulation unit
30 data utilization unit
101 elevator landing area
102 space adjacent to elevator landing area
103 stairs
111 to 116 elevator car
121 landing area entrance camera
122 landing area camera
121*a*, 122*a* measurement range
131 queueing start detection line
132, 133 boarding detection line
134 outflow detection line
135, 136 queueing start detection line (dynamically set)
201 queueing reference position
202 queue tail end position
203, 204 line segment
211 high density range
212 medium density range
213 low density range The invention clamied is:

1. A device for estimating an elevator waiting time, the device comprising:

a queueing start measurement unit which measures arrival of an elevator user at a preset location;

a boarding measurement unit which measures boarding of the elevator user in an elevator car;

a storage unit which stores an arrival time measured by the queueing start measurement unit and a boarding time measured by the boarding measurement unit; and a waiting time calculation unit which, on the basis of the arrival time and the boarding time stored in the storage unit, calculates a waiting time for which the elevator user is expected to wait before boarding the elevator car, wherein the waiting time calculation unit sets a value obtained by subtracting an n-th (n is an arbitrary integer) arrival time measured by the queueing start measurement unit from the n-th boarding time measured by the boarding measurement unit as a waiting time of a user who has arrived at the preset location and has queued n-th.

2. The device for estimating an elevator waiting time according to claim 1, further comprising:

a queueing position detection unit which detects a position when an elevator user queues, wherein the queueing position detection unit dynamically detects a tail end when the elevator user queues, and dynamically changes the preset location where the queueing start measurement unit performs the measurement.

3. The device for estimating an elevator waiting time according to claim 1, further comprising:

an outflow measurement unit which measures that a user has not used the elevator, the arrival of the user at the preset location being measured by the queueing start measurement unit, wherein the waiting time calculation unit calculates the waiting time by excluding data of the number of people who have flown out without using the elevator and have been detected by the outflow measurement unit from data measured by the queueing start measurement unit.

4. The device for estimating an elevator waiting time according to claim 1, further comprising:

a display unit which displays an operation index or an operation status of the elevator by using the waiting time calculated by the waiting time calculation unit.

5. A method for estimating an elevator waiting time, the method comprising:

a step of measuring, by a queueing start measurement unit, an arrival time at which an elevator user arrives at a set queueing start position;

a step of measuring, by a boarding measurement unit, a boarding time at which the elevator user boards an elevator car;

a step of storing the arrival time and the boarding time in a storage unit; and a step of calculating, by a waiting time calculation unit, a waiting time for which the elevator user is expected to wait before boarding the elevator car, based on the arrival time and the boarding time stored in the storage unit, wherein the waiting time calculation unit sets a value obtained by subtracting an n-th (n is an arbitrary integer) arrival time measured by the queueing start measurement unit from the n-th boarding time measured by the boarding measurement unit as a waiting time of a user who has arrived at the preset location and has queued n-th.

* * * * *